United States Patent Office 3,299,157
Patented Jan. 17, 1967

3,299,157
PERMEABLE MEMBRANE AND METHOD OF MAKING SAME FOR USE IN A PARAXYLENE SEPARATION
Raymond F. Baddour, Belmont, and Alan S. Michaels, Lexington, Mass., assignors to Amicon Corporation, Cambridge, Mass., a corporation of Massachusetts
No Drawing. Filed Mar. 7, 1961, Ser. No. 93,842
4 Claims. (Cl. 260—674)

This invention relates to the separation of one ingredient of a mixture of fluid materials from the remaining ingredients of the mixture and pertains more specifically to the selective diffusion of a fluid mixture through a permeable membrane of polymeric material and to the preparation of such membranes.

It has been known for many years that thin films or membranes of natural or synthetic polymeric materials are permeable to fluid materials in the form of gases, vapors or liquids. In order to be useful for the separation of fluid mixtures into their respective components, however, the membranes must exhibit selective permeability toward the ingredients of the mixture. Up until the present time diffusion through permeable membranes has not achieved widespread commercial utility as compared with distillation or other separation methods for several reasons, one of the most important of which is the impossibility of determining in advance which of many possible polymeric membranes will exhibit selective permeability toward the ingredients of any given mixture. Other obstacles to the use of diffusion as a separation technique are the low transmission rates of substances through conventional polymeric membranes and the small differences between diffusion rates of chemically similar materials, resulting in high energy requirements and inefficiency of the process.

The present invention makes possible the preparation of polymeric membranes specifically deisgned to display enhanced permeability to a selected single ingredient of any given mixture even when the ingredients are very similar to each other in chemical and physical properties, e.g., are position isomers. The membranes prepared in accordance with the present invention and which exhibit the desired enhanced permeability may be employed in a single- or multi-stage diffusion process which will effectively separate the ingredients. The separation may be carried out at any convenient temperature while the ingredients of the mixture are in gaseous, vaporous or liquid form, the diffusion being brought about by maintenance of a pressure or concentration differential between opposite faces of the membrane. The separation may also be carried out while the mixture is dissolved in a liquid solvent, in which case a concentration differential may be used to bring about diffusion by flowing a supply of pure solvent in contact with the downstream face of the membrane to dissolve and carry away the material diffusing through.

The polymeric material selected for use as the membrane may be any of the well-known film-forming natural or synthetic polymeric materials which are capable of being sheeted out to form a film or membrane having substantial mechanical strength and having a thickness no greater than about 0.05 inch. In most cases the membrane preferably has a thickness from 0.0005 to 0.010 inch. The polymeric material must also be one in which the ingredients of the mixture will dissolve or be absorbed to the extent of 1% to 30% by weight of the dry membrane at the temperature at which the diffusion separation is to be carried out. For most conventional polymeric films, this temperature is from −50° to 200° C., preferably from 0° to 50° C. The extent to which a wide variety of fluid materials are dissolved by or absorbed by particular polymeric materials is well known; and in any case where the solubility is not well known it can, of course, be readily determined by a simple test, as is well known to those skilled in the art.

The membrane of polymeric material which has been so chosen must then be subjected to swelling or solvation by one selected ingredient of the mixture of fluid materials which is to be separated. Selection of the ingredient of the mixture which is to be employed for this purpose is determined by consideration of the molecular cross-sectional areas of the components comprising the mixture. If it is desired to separate from such a mixture, in high purity and with optimum efficiency, the ingredient or component possessing the smallest molecular cross-sectional area, then that component should be employed for treatment of the membrane. If, on the other hand, it is desired to separate from the mixture some other component, treatment of the membrane with any component having a molecular cross-sectional area smaller than that of the desired component may be carried out, although treatment with a component having a molecular cross-sectional area intermediate in size between that of the smallest component and that of the desired component may often be preferred.

The molecular cross-sectional area of each ingredient is determined by dividing the molecular volume of the ingredient—i.e., the volume occupied by a single molecule of the ingredient (which may be determined by molar refraction measurements or by any other conventional means)— by the maximum linear dimension of the molecule as determined from a Stuart and Briegleb molecular model.

In the event that isolation of the selected ingredient from the mixture should be undesirable or inconvenient and if a supply of the ingredient from other sources is not available, there may be employed for treatment of the membrane any other substitute material which has a cohesive energy density (latent heat of vaporization of liquid material per cubic centimeter of liquid) within 20% of that of the selected ingredient and which has a molecular cross-sectional area equal to or less than that of the selected ingredient.

The swelling or solvation of the polymeric membrane by the selected ingredient or substitute material must be carried out at a temperature at least 5° C. higher than the temperature at which the ultimate diffusion separation is to be carried out. However, the swelling or solvation temperature must be less than the temperature at which the polymeric membrane dissolves in the selected ingredient to such an extent that the membrane loses its integrity. In general, this step is carried out at a temperature at which the membrane absorbs from 1% to 50% by weight of said ingredient or substitute material, preferably from 5% to 15% by weight. The polymeric membrane is allowed to remain immersed in the ingredient for a sufficiently long period of time to ensure that equilibration between the two has occurred.

The membranes which have been equilibrated in this fashion are found to exhibit substantially increased permeability for the selected ingredient while permeability of the remaining ingredients of the mixture has been either substantially reduced or has been increased only to a slight extent, much less than the permeability for the selected ingredient has been increased.

The polymeric membrane so prepared may be removed from the excess mass of selected ingredient or substitute material and employed immediately in a diffusion separation process at the selected temperature without drying or removal of the selected ingredient from it, and it may also be permitted to dry at room temperature before use if desired. For best results, however, it is preferred that the polymeric membrane, after having been saturated as described above, be separated from the excess ingredient or substitute material and then heated at a substantially higher temperature (preferably within 10° C. of the temperature at which melting or dissolution of the membrane containing the absorbed material occurs) while preventing any substantial evaporation of the absorbed material from the membrane. This procedure may be carried out, for example, by blotting the surface of the membrane to remove excess material, then suspending the membrane in a sealed container which is heated to the desired temperature.

Following the optional heating step described above, the membrane may be cooled to the selected operating temperature and used immediately for diffusion separation of the desird mixture. It is also possible to evaporate all of the selected ingredient from the polymeric membrane, either after the equilibration step or after the subsequent heating step, and to store the membrane at any convenient temperature such as room temperature for any desired length of time before utilizing it for diffusion separation of the mixture.

While the mechanism of operation of the present invention is not fully understood and we do not wish to be bound by the following explanation, it is believed that the mechanism is entirely physical in nature and does not involve any chemical modification or transformation of the polymeric membrane. It is believed that partial solution of the polymeric material in the selected ingredient or substitute material occurs and that the crystallites present in the polymeric membrane are rearranged and/or dissolved and reformed so that passages or apertures through the membrane corresponding in size to the size of the molecules of the ingredient are preferentially formed while the number of passageways or apertures of different size normally present in the polymeric membrane is decreased.

The following specific example is intended to illustrate the nature of the invention in greater detail, but is not intended as a limitation upon its scope. It will be understood that other polymeric materials may be substituted for the polyethylenes here described and that other mixtures of fluid materials may be substituted for the mixture of xylenes employed in the following examples with equivalent results.

*Example*

The fluid material which was chosen for separation consisted of a liquid mixture of ortho-, meta-, and paraxylene. It was determined by simple test that a conventional one-mil film of high density (0.9570 g./cc.) polyethylene was capable of absorbing about 10% by weight of the mixture at 50° C. It was also determined from molar refraction measurements that the molecular volume of each of the three xylenes was as shown in the following table. The maximum molecular linear dimension in Angstrom units of each of the xylenes was determined by constructing a Stuart and Briegleb model and measuring it. The quotient of these two values is the molecular cross-sectional area or apparent diffusion cross-sectional area of the molecule, as shown in the following table:

|  | Molecular Volume A.³/molecule at 20° C. | Maximum Linear Molecular Dimension, A. | Molecular Cross Sectional Area |
|---|---|---|---|
| Orthoxylene | 59.7 | 7.80 | 7.65 |
| Metaxylene | 59.8 | 8.33 | 7.20 |
| Paraxylene | 59.9 | 8.67 | 6.92 |

It is clear from the values set forth in the foregoing table that the paraxylene has the smallest molecular cross-sectional area of the three ingredients in the mixture, and it was therefore selected as the ingredient for treating the polymeric membrane.

A sample of the high density polyethylene film was immersed in a bath of pure liquid paraxylene and heated at 100° C. for 24 hours, cooled, and dried at 25° C. This treated film was then mounted in a conventional diffusion apparatus, a mixture of liquid xylenes containing, by weight, 30% ortho-, 65% meta-, and 5% paraxylene being supplied to one face of the membrane at a temperature of 30° C. while the opposite face of the membrane was maintained under a vacuum less than 0.1 mm. of mercury. The mixture which diffused through the membrane was analyzed and found to contain 20.9% ortho-, 72.1% meta-, and 7.0% paraxylene. This represents a 40% increase in the proportion of paraxylene in the mix after only a single pass, while the proportion of orthoxylene has decreased by 30% and the proportion of metaxylene has increased by only 11%.

The same treated film was used for diffusion separation, under the same conditions, of a mixture containing, by weight, 90% ortho-, 5% meta-, and 5% paraxylene. After a single pass through the membrane, the mixture contained 83.4% ortho- (a decrease), 7.4% meta- (a 48% increase), and 9.2% para- (an 84% increase).

The foregoing results agree very closely with the calculated results based upon measurements of individual permeability coefficients of each of the three isomers separately through the treated film or membrane. Such permeability coefficient measurements show that a marked increase in permeability of paraxylene through the film is achieved by treating the film with paraxylene at temperatures as low as 35° C., when the permeation step is carried out at 30° C. (although optimum results are obtained by treating at 50° C.), while at the same time the permeability of ortho- and metaxylene is increased to a markedly lesser extent by the treatment.

In addition to the aforementioned improvements in separation of the xylene isomers achieved by use of these treated membranes, it is also found that polyethylene membranes treated by the method herein described show markedly enhanced total or overall permeability to the liquid mixtures.

In many situations where use of polymer membranes for separation of mixtures is to be considered, the increase in permeability of the membranes resulting from the treatment described herein may be of great practical importance in addition to any increase in selectivity of the membrane.

When the separation is to be carried out at a moderate temperature, e.g., 50° C., optimum results are obtained by first saturating the membrane with paraxylene at 70° C., then removing excess xylene from the membrane by blotting with absorbent paper and placing the saturated membrane in a container which is sealed, then heated at 100° C. for several hours, after which the membrane is cooled to 25° C. and allowed to dry.

Similar results are obtained when the mixture of xylenes is in the vapor state at the time it is brought into contact with the membrane.

Low density (0.9177 g./cc.) one-mil polyethylene film exhibits similarly enhanced permeability toward paraxylene (in either vapor or liquid form) when treated with liquid paraxylene at temperatures from 25° to 100° C., provided that the treatment temperature is at least as high as the temperature at which the diffusion is carried out.

The fact that low density polyethylene dissolves substantially completely in liquid paraxylene at about 63° C., while high density polyethylene has a dissolution temperature of about 105° C., places a limitation upon the maximum temperatures at which these polyethylenes can be treated with liquid paraxylene. If, however, the total quantity of paraxylene which the membrane is permitted to imbibe is limited, for example by separating the swollen membrane from the bulk or mass of paraxylene as described above, the maximum temperature to which the swollen membrane may be heated without losing its integrity will be higher than the foregoing figures; the maximum permissible temperature increases as the paraxylene content of the membrane is decreased.

Instead of using a pressure differential across the membrane to induce diffusion therethrough, it is also possible to employ a concentration differential, as for example by supplying to one side of the membrane a concentrated solution of the mixture in any suitable solvent, and collecting from the other side of the membrane a more dilute solution in the same solvent.

The treatment of the present invention, which not only selectively increases the permeability of the membrane to the selected ingredient as compared to the remaining ingredients of the mixture but which also in most cases increases the absolute permeability or rate of diffusion through the membrane, thus makes it possible to reduce very greatly the area of membrane required to achieve a specified rate of separation as well as to reduce the number of cascade stages required.

Although specific embodiments of the invention have been described herein, it is not intended to limit the invention solely thereto, but to include all of the obvious variations and modifications within the spirit and scope of the appended claims.

What is claimed is:

1. The method of making a diffusion membrane which has a selective permeability for paraxylene of a mixture of ortho-, meta-, and paraxylene which comprises selecting paraxylene, providing a membrane of low density polyethylene in which said paraxylene is soluble to the extent of 1% to 30% by weight at a selected temperature more than 10° C. below the temperature at which dissolution of said membrane in said paraxylene occurs, maintaining said membrane in contact with a mass of said paraxylene at a temperature below said dissolution temperature and at least 5° C. above said selected temperature to cause said membrane to absorb said paraxylene and cooling said membrane to said selected temperature.

2. The method of separating paraxylene from a mixture of fluid materials which comprises preparing a diffusion membrane as claimed in claim 1, thereafter placing one side of said membrane in contact with a supply of said mixture, and reducing the pressure at the opposite side of said membrane to cause said paraxylene to diffuse therethrough.

3. The method of making a diffusion membrane which has a selective permeability for paraxylene of a mixture of ortho-, meta-, paraxylene which comprises selecting paraxylene, providing a membrane of high density polyethylene in which said paraxylene is soluble to the extent of 1% to 30% by weight at a selected temperature more than 10° C. below the temperature at which dissolution of said membrane in said paraxylene occurs, maintaining said membrane in contact with a mass of said paraxylene at a temperture below said dissolution temperature and at least 5° C. above said selected temperature to cause said membrane to absorb said paraxylene, and cooling said membrane to said selected temperature.

4. The method of separating paraxylene from a mixture of fluid materials which comprises preparing a diffusion membrane as claimed in claim 3, thereafter placing one side of said membrane in contact with a supply of said mixture, and reducing the pressure at the opposite side of said membrane to cause said paraxylene to diffuse therethrough.

References Cited by the Examiner
UNITED STATES PATENTS

| | | | |
|---|---|---|---|
| 2,159,434 | 5/1939 | Frey | 210—23 |
| 2,947,687 | 8/1960 | Lee | 260—674 |
| 2,960,412 | 11/1960 | Lee et al. | 260—674 |
| 2,984,623 | 5/1961 | Lee | 260—674 |
| 3,035,060 | 5/1962 | Binning et al. | 210—23 |
| 3,043,891 | 7/1962 | Stuckey | 260—674 |

OTHER REFERENCES

Raff et al.: Polyethylene, pp. 236–240 and 247–262 relied on, Interscience Publishers, Inc., N.Y., 1956.

Maibauer et al.: Transactions of the Electrochemical Society, vol. 90, pp. 352–355 relied on, 1947.

DELBERT E. GANTZ, *Primary Examiner.*

ALPHONSO D. SULLIVAN, *Examiner.*

J. HALL, C. E. SPRESSER, *Assistant Examiners.*